United States Patent [19]

Kotala et al.

[11] 4,029,379
[45] June 14, 1977

[54] ELECTRICAL BUS DUCT WITH TORQUE INDICATION NUT

[75] Inventors: James R. Kotala, Aliquippa; William W. Hamilton, Beaver, both of Pa.

[73] Assignee: Westinghouse Electric Corporation, Pittsburgh, Pa.

[22] Filed: Sept. 14, 1973

[21] Appl. No.: 397,485

[52] U.S. Cl. .................................. 339/22 B; 85/61
[51] Int. Cl.² .................. F16B 31/00; H01R 13/60
[58] Field of Search ............... 339/22, 113; 85/61, 85/62

[56] References Cited

UNITED STATES PATENTS

| | | | |
|---|---|---|---|
| 2,824,481 | 2/1958 | Johnson | 85/62 |
| 3,027,796 | 4/1962 | Shewmon | 85/61 |
| 3,444,775 | 5/1969 | Hills | 85/61 |
| 3,459,872 | 8/1969 | Weimer et al. | 151/54 |
| 3,512,447 | 5/1970 | Vaughn | 85/61 |

FOREIGN PATENTS OR APPLICATIONS 1,490,954  6/1967  France .................................. 85/61

Primary Examiner—Robert A. Hafer
Attorney, Agent, or Firm—M. J. Moran

[57] ABSTRACT

A torque indicating nut for use with a complimentary bolt. The bolt and nut assembly is utilized to join sections of electrical bus duct and the electrical conductors contained therein. The torque indicating nut comprises three sections: an engaging section, a driving section and a bridging section. The engaging section is threaded onto the complimentary portion of the previously mentioned bolt and rotated thereon to complete the assembly of adjacent sections of electrical bus duct and the conductors contained therein. When a predetermined value of torque has been reached at the driving section of the torque indicating nut, the bridging section fractures or breaks and falls away.

2 Claims, 6 Drawing Figures

ELECTRICAL BUS DUCT WITH TORQUE INDICATION NUT

BACKGROUND OF THE INVENTION

1. Field of the Invention

This invention relates to fastening means in general and in particular to fastening nuts for electrical bus duct and conductors.

2. Description of the Prior Art

It is known in the prior art to provide complimentary bolts and nuts for use in assembling sections of bus run. It is also known to provide the head of the bolt with a break-away section so that an indication is given when the proper torque has been applied to the bolt-nut combination to complete fastening of the adjacent sections of bus duct without causing internal damage due to excessive tightening. It would be advantageous if a means could be provided for fastening adjacent sections of bus duct together using a nut and bolt fastener that was inexpensive, relatively easy to manufacture, which provided an indication of torque or force, which aided in the inspection of the fastened joints from a distance, which provided enhanced safety features and which could be replaced easily without the need of removing an entire bolt from the bus run.

SUMMARY OF THE INVENTION

In accordance with the invention a torque indicating nut for use with a complementary bolt for securing adjacent sections of bus run together is provided. The torque indicating nut is easily manufactured because of its relative small size and ease of handling when compared with the bolt. In addition, should the nut be defective or fail in any way it can be replaced easily without the need for removing the entire bolt from the assembly as is the case when the torque indicating feature is provided on the bolt head rather than on the nut. The nut comprises an engaging portion and a driving portion joined by a bridging portion. The engaging portion has threads therein which are complementary with the threads on the bolt. The driving portion has an central opening which allows the bolt to feed through without engagement as the engaging portion is driven on the bolt to tighten the assembly. The bridging or joining portion comprises a relatively thin cylindrical section of metal which can easily change dimension, fracture or disengage when a predetermined level of torque or force is applied to the driving section. In one embodiment of the invention the driving nut is color-coded so that a visual inspection can be made of remotely located bus duct after the torquing operation has taken place to note whether the color-coded portion is viewable or not. If it is not viewable, that indicates that the nut has fallen off due to the attainment of the proper torquing value. If it is viewable, that indicates that proper torque has not been attained on that nut. As can be easily seen, not only does this aid in remote inspection, but it adds a safety feature to the assembly as non-fastened nuts allow the bus bars to move during certain operating condition. In another embodiment of the invention a thin electrically insulating disc having a central opening is provided where the disc completely encloses the relatively smaller bridged portion of the torque indicating nut but is trapped between the driving portion and engaging portion thereof because of the relative diameters or raidal dimensions of the various members. The only way this portion can be easily disengaged from the torque indicating nut is if the driving portion has been broken away from the engaging portion.

BRIEF DESCRIPTION OF THE DRAWINGS

For a better understanding of the invention reference may be had to the preferred embodiments exemplary of the invention shown in the accompanying drawings in which.

DESCRIPTION OF THE PREFERRED EMBODIMENTS

Figure 1:
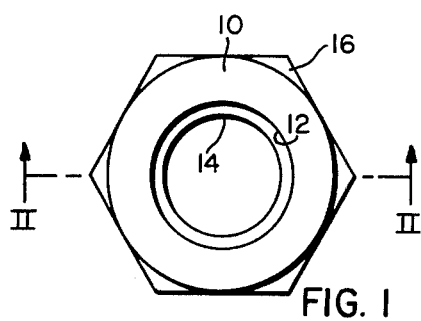
FIG. 1 shows a top view of a torque indicating nut.

Referring now to the drawings and in FIG. 1 in particular, a torque indicating nut 10, which may be otherwise known as a force indicating nut, is shown. Torque indicating nut 10 includes as one portion thereof a central hole or bore 12 and a concentric but smaller longitudinally aligned central hole or bore 14 which maybe threaded. The threaded portion 14 is capable of being rotated or screwed onto a complimentary threaded portion of a bolt. As the nut 10 is threaded onto the bolt portion the threaded portion of the bolt may protrude or feed into the bore 12 which is larger in diameter than the diameter of a bolt which would be complimentary to the threaded portion 14. Consequently, the bore 12 offers no obstacle to the turning of the torque indicating nut or device 10 onto a bolt.

The torque indicating nut 10 in this embodiment of the invention includes outer side walls 16 disposed in the shape of a hexagon for ease in driving the torque indicating nut or device 10 with a torque wrench or other suitable driving means.

Figure 2:
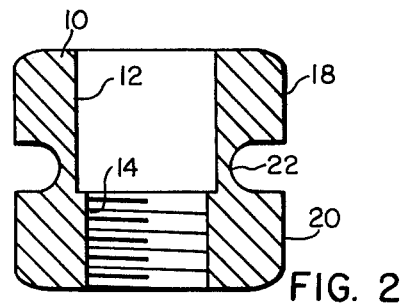
FIG. 2 shows a sectioned side elevation of the nut shown in FIG. 1.

Referring now to FIG. 2, a sectioned side elevation of the torque indicating nut or force indicating device 10 of FIG. 1 is shown. The relationship of the central bore 12 to the smaller threaded central bore 14 is easily seen in FIG. 2. The torque indicating device has three main portions; namely, a driving portion 18 adjacent the central opening 12, an engaging portion 20 adjacent the threaded central bore 14, and a bridging portion 22 which communicates between the latter two portions 18 and 20. Both the driving portion 18 and the engaging portion 20 may be of hex stock as was previously described for ease in moving or rotating the nut on a complimentary threaded bolt or member. The bridging portion 22 is of relatively thin stock or material when compared with the driving portion 18 and engaging portion 20. It can be predetermined with a high degree of accuracy at what value of force or torque the bridging portion 22 will change dimension or fracture as the torque indicating nut or device is moved onto a complimentary member into forceful engagement with bus duct or another object. The change in dimension or fracturing of the bridging member 22 causes a corresponding change in the spaced relationship between the driving means 18 and the engaging means 20. This is useful for indicating when a predetermined value or torque or force has been reached. It can be seen that in some embodiments, the bridging member 22 may merely collapse such that the longitudinal spacing between the driving member 18 and engaging member 20 changes. In another embodiment of the invention the bridging member 22 may twist transversely or laterally, thus changing the orientation of the driving member 18 with respect to member 20 without necessarily changing the longitudinal spacing between them. In the preferred embodiment of the invention the application of a predetermined value of torque to the driving means 18 while it is on a bolt or similar complimentary member will cause engaging member 20 to contact and offer force against an object, such as a portion of a bus duct assembly in the preferred embodiment of the invention, and will cause the bridging member 22 to fracture causing the driving member 18 to be broken away from the engaging member 20. It will be noted in this embodiment that the engaging member 20 is of hex stock or of another similar configuration so that it may be unscrewed from or rotated off of the bolting member if that is desirable. In another embodiment of the invention, the driving member 18 may be of a different color than the engaging member 20. As an example the driving member 18 may have a red stain, dye or paint placed thereupon. Consequently, when the predetermined value of torque has been reached, and the bridging member 22 has been broken away, the red or otherwise colored driving member 18 is no longer part of the assembly. Consequently, when viewed from afar, it is easy to determine that the proper predetermined torque has been reached because if it has, the colored engaging member 18 will not be visible. In the preferred embodiment of the invention, opposite parallel sides 16 of the hex stock are 0.75 inches apart. The central bore 12 has a diameter of 0.506 inches and the threaded portion is characterized by a 0.5–13 thread. The radius of curvature of the bridging member 22 is 0.06 inches and the spacing between the driving member 18 and the engaging member 20 is 0.125 inches. The closest portions of the bridging member 22 to the central line of the bores 12 and 14 are at a 0.283 inch radius.

Figure 3:
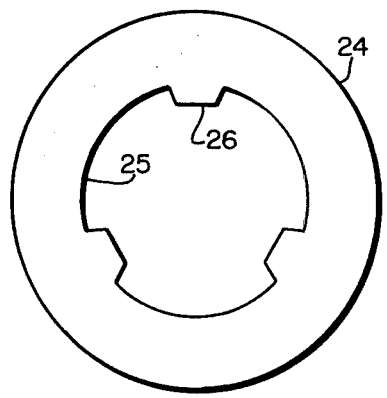
FIG. 3 shows a torque indicating washer for use with the torque indicating nut of FIGS. 1 and 2.

Referring now to FIG. 3 there is shown an indicating member 24 which is in the general shape of a relatively thin disc having a central opening 25 therein. In the embodiments shown in FIG. 3, the disc may comprise red plastic material of approximately 1/64 inch thickness having a central opening of maximum diameter of 19/32 of an inch and having an outer diameter of 1⅛ inches. In the embodiment of the invention shown in FIG. 3 there are three protrusions 26 having arcuate portions thereon which describe a relatively smaller diameter than the 19/32 of the central opening. The central opening is adapted to encircle or enclose bridging member 22 and to be entrapped or held in place between the space portions 18 and 20 of the nut 10. It is preferable that the material of the member be flexible so that it may be twisted and flexed to be placed on the nut before assembly with a bolt or other member.

Figure 4:
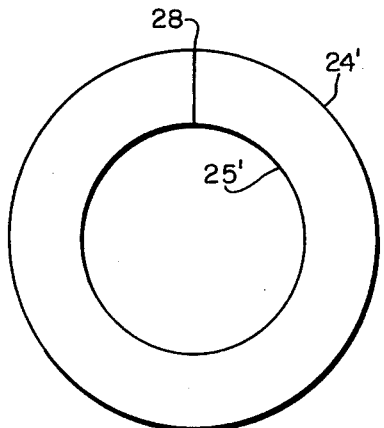
FIG. 4 shows another embodiment of an indicating washer for use with the torque indicating nut of FIGS. 1 and 2.

Referring now to FIG. 4 there is shown another embodiment of the indicating member or ring 24' which is similar to ring 24 of FIG. 3. There is a central opening 25' which is generally of the same general dimensions as the central opening 25 of the ring shaped indicator of FIG. 3. There is also a radial slit 28 so that the washer or indicating member 24' may be opened in such a manner as to place it conveniently around the bridging member 22.

Figure 5:
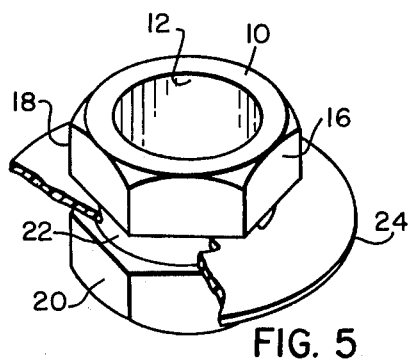
FIG. 5 shows a perspective view of a torque indicating nut assembly including a broken away portion of an indicating washer such as is shown in FIG. 3.

Referring now to FIG. 5 there is shown an assembled torque indicating nut 10 and a portion of an indicating ring 24. The hexed portions of the nut 16 are shown as well as the three main portions of the nut 10; namely the driving portion 18, the bridging portion 22, and the engaging portion 20. The disposition of the ring 24 is shown on the bridging member 22. It will be noted that the central opening is smaller than the outer dimensions of the portions 18 and 20 so that it may not easily fall away from the nut 10. However, the central opening is large enough in diameter to fit loosely on the bridging portion 22. In a torquing operation the driving portion 10 is broken away at bridging member 22 when sufficient predetermined torque is applied to the torque indicating nut 10 during assembly on bus duct or otherwise. At that point, the ring 24 is free to fall away from the remaining portion 20 of the torque indicating nut 10.

Figure 6:
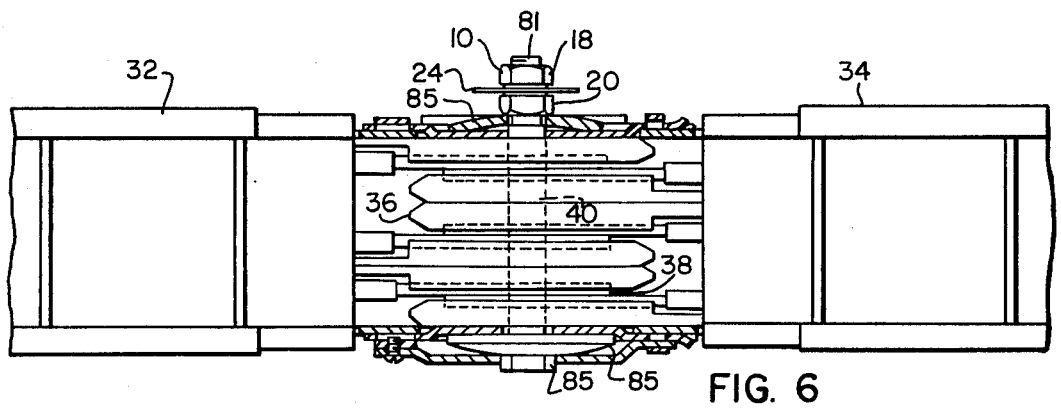
FIG. 6 shows the joint between two adjacent sections of bus run where the torque indicating nut of the invention is utilized.

Referring now to the bus duct assembly of FIG. 6 it can be seen that the bus ducts 32 and 34 have protruding electrical conductor portions 36 which are interspaced by electrically insulating members 38. There is a common central bore to all the elements of the adjacent assemblies 32 and 34 which is generally designated 40 in FIG. 6 and which is insulated from the conductors 36. A bolt 87 is fed through the common bore 40. A Bellville spring or similar compression means 85 is provided so that the torque indicating nut 10 may be threaded or rotated onto the threaded portion 81 of the bolt 87 to a position to compress the Bellville spring or springs 85. The driving portion 18 is driven with a torque wrench or similar torque producing means until the force provided by the compression of the engaging portion 20 against the Bellville spring 85 offers sufficient resistance to the torque driving means to cause the driving portion 18 to fracture and break away from the engaging portion 20. At that point the indicating ring 24 is free to fall away or be forced away from the nut 10 to indicate that the proper torque has been achieved. The assembly of FIG. 6 is shown in more complete detail in U.S. Pat. No. 3,459,872 issued to C. L. Weimer et al. on Aug. 5, 1969 and assigned to the same assignee as the assignee of the present invention. It will be noted in that patent though that the bolt 87 is secured or fastened by a different nut than the nut 10 shown in the present FIG. 6, the torque indicating nut 10 shown in FIG. 6 providing advantages and features over the nut shown in the previously described patent.

It is to be understood that the torque indicating nut 10 may be used with other apparatus than bus duct and the compression means provided need not necessarily be a Bellville type spring. It is also to be understood that the characteristic hex shape shown in FIGS. 1, 2, and 6 need not be present on either or both the driving means 16 and engaging means 20. It is also to be understood that the nut assembly 10 may be made of any convenient material, such as stainless steel, copper, brass, or even in some cases non-electrically conducting material. It is also to understood that the embodiments best exemplified by FIGS. 3 and 4 are not limiting and that other types of indicating rings having other characteristic shapes and dimensions may be used if that is convenient and desirable. It is also to be understood that the exact diminsions given with respect to FIGS. 1, 2, 3, 4, and 5 are not limiting, but are only exemplary. It is also to be understood that the characteristic shape of the bridging member may be altered for convenient purposes and the concaved radial portion shown associated therewith is exemplary only.

The apparatus embodying the teachings of this invention have certain advantages. One advantage lies in the fact that it is better to have a torque indicating nut rather than a torque indicating bolt as a torque indicating nut is usually smaller and more compact than a bolt and consequently is more easily handled and manufactured. In addition, a torque indicating nut can be replaced much more easily and conveniently than a torque indicating bolt because the bolt would have to be completely disengaged from all the members it is meant to join which may cause them to collapse or fall apart. Another advantage lies in the fact that the torque indicating nut can be used on bolts of varying size, whereas a torque indicating bolt is generally used with the same size nut. Another advantage lies in the fact that the bolt is usually not turned in an assembly procedure; rather it is better to turn the relatively small nut upon the relatively larger bolt. Consequently, it can be seen that the application of the torque which causes the eventual deformation fracture of the torque indicating nut is more direct than with a torque indicating bolt.

What we claim as our invention is:

1. A torque indicating nut, comprising:
   an engaging portion having an internally threaded opening therein, said engaging portion being engageable with a member having a complementary externally threaded portion thereon, said engaging portion being rotatably movable in threaded engagement with said member to cause force to be applied to an object by said engaging portion;
   a driving portion, said drivin portion being rotatably movable, said driving portion having an opening through which said member may protrude, said opening having no internally threaded portion;
   a bridging portion having an opening through which said member may protrude, said driving portion communicating with said engaging portion by way of said bridging portion to cause said engaging portion to move into contact with said object during rotation of said driving portion to apply said force to said object, the radial dimensions of said driving portion and said engaging portion being larger than the radial dimension of said bridging portion; and
   a relatively flexible indicating member easily observable relative to said driving portion and having an opening therein which is sufficiently large to allow said indicating member to enclose said bridging portion but which is not sufficiently large to allow said indicating member to enclose said driving portion or said engaging portion, said indicating member being a separately manufactured article from said bridging portion, said engaging portion and said driving portion, said indicating member being initially flexed for disposal around said bridging portion and thereafter trapped between said driving portion and said engaging portion, said bridging portion maintaining a spaced relationship between said engaging portion and said driving portion until a predetermined value of said force is applied to said object, which force is related to a predetermined value of torque to which said driving portion is submitted during rotation, said driving portion being disengageable from said engaging portion at said bridging portion after said predetermined value of torque is attained, said indicating member then being freeable from said bridging portion to thereby indicate that said predetermined valve of said torque has been attained.

2. A bus duct assembly, comprising:
   an electrically conducting bus bar adapted to be connected to another electrically conducting bus bar, said bus bar having an opening therein to accommodate a bolt which feeds through a similar opening in said another electrically conducting bus bar for joining said bus bars physically for providing electrical conduction therebetween;
   a bus duct having oppositely disposed openings therein, to accommodate a bolt, said bus duct enclosing said bus bar;
   compression means having an opening therein to accommodate a bolt to secure said bus bar to said another bus bar;
   a bolt having a threaded portion and a head, said bolt being disposed in said openings, in said bus duct and said bus bar to fasten said bus bar to said another bus bar within said bus duct, said compressing means being disposed on said bolt to enhance said fastening upon compression; and
   a torque indicating nut, comprising: an engaging portion having an internally threaded opening therein, said engaging portion being engageable with the threaded portion of said bolt, said engaging portion being rotatably movable in threaded engagement on said bolt to cause force to be applied to said compression means to enhance the fastening of said bus bar to said another bus bar, a driving portion, said driving portion be rotatably movable, said driving portion having an opening through which said bolt may protrude, said latter opening having no internally threaded portion, a bridging portion having an opening through which said bolt may protrude, said driving portion communicating with said engaging portion by way of said bridging portion to cause said engaging portion to move into contact with said compression means during rotation of said driving portion to apply said force to said compression means, the radial dimensions of said driving portion and said engaging portion are larger than the radial dimension of said bridging portion; and
   a relatively flexible indicating member easily observable relative to said driving portion and having an opening therein which is sufficiently large to allow said indicating member to enclose said bridging portion but which is not sufficiently large to allow said indicating member to enclose said driving portion or said engaging portion, said indicating member being a separately manufactured article from said bridging portion, said engaging portion and said driving portion, said indicating member being initially flexed for disposal around said bridging portion and thereafter trapped between said driving portion and said engaging portion, said bridging portion maintaining a spaced relationship between said engaging portion and said driving portion until a predetermined value of said force is applied to said compression means which force is related to a predetermined value of torque to which said driving portion is submitted during rotation, said driving portion being disengageable from said engaging portion at said bridging portion after said predetermined value of torque is attained, said indicating member then being freeable from said bridging portion to thereby indicate that said pretermined value of said torque has been attained.

* * * * *